July 25, 1967     A. M. LOCKIE ET AL     3,333,221

TRANSFORMER HAVING TEMPERATURE RESPONSIVE LEAKAGE REACTANCE

Original Filed Dec. 3, 1962

United States Patent Office 3,333,221
Patented July 25, 1967

3,333,221
TRANSFORMER HAVING TEMPERATURE RESPONSIVE LEAKAGE REACTANCE
Arthur M. Lockie, Sharpsville, and Andrew W. Edwards, Murrysville, Pa., assignors to Westinghouse Electric Corporation, Pittsburgh, Pa., a corporation of Pennsylvania
Original application Dec. 3, 1962, Ser. No. 241,637. Divided and this application Aug. 20, 1965, Ser. No. 481,177
5 Claims. (Cl. 336—179)

This is a division of application Ser. No. 241,637, now abandoned, filed Dec. 3, 1962.

This invention relates to electrical apparatus and more particularly to protective devices for electrical inductive apparatus.

The application of distribution transformers is complicated by the fact that they are subjected to widely varying load cycles. A transformer rating must be chosen that is large enough to safely carry the peak load, but yet is as small as possible to keep the investment in transformer capacity to a minimum.

It would be desirable to have a method of reducing the load on the transformer as much as practical when the transformer reaches a certain temperatures, above which damage to the transformer would be imminent. One method of doing this would be to decrease the output voltage on the secondary winding of the transformer within allowable limits by introducing additional reactance or impedance into the circuit when the temperature of the transformer reaches a predetermined value.

Accordingly, it is the general object of this invention to provide a new and improved electrical inductive apparatus.

It is a more particular object to provide new and improved protective apparatus that will reduce the output voltage of inductive apparatus when the temperature of said inductive apparatus reaches a predetermined magnitude.

Briefly, the present invention accomplishes the above stated objects by providing a protective system that increases its reactance or impedance sharply at a predetermined temperature. More specifically, one embodiment of the invention utilizes a reactor having a core constructed of material that changes its magnetic characteristics at a predetermined temperature connected in circuit relation with one of the windings of the electrical apparatus to be protected. The reactor and core are disposed in thermal communication with said electrical apparatus and when the predetermined temperature is reached, the increase in reactance of the reactor due to the change in magnetic properties of the core causes the output voltage of the electrical apparatus to decrease and thus reduce the load on said electrical apparatus. When the temperature of the electrical apparatus falls below the predetermined temperature, the core of the reactor reverts to its prior condition and the reactance of the reactor decreases, allowing the output voltage of the electrical apparatus to increase to its former magnitude.

Another embodiment of the invention utilizes the temperature responsive material between the windings of a transformer to change the leakage reactance and hence the output voltage of the transformer at a predetermined temperature.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings, in which.

Figure 1:
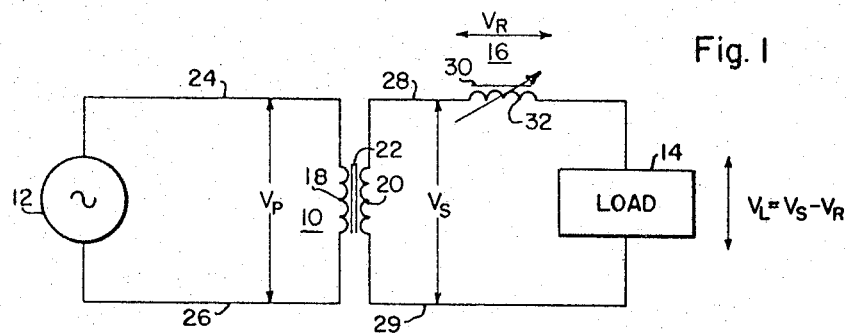
FIGURE 1 shows a basic schematic diagram of how the invention may be located in an electrical circuit.

Referring now to the drawings, and FIG. 1 in particular, a transformer 10 is illustrated, with one winding connected to a source of potential 12 and another winding connected to a load 14. A variable reactor 16 is shown connected in the transformer load circuit. More particularly, transformer 10 is comprised of primary and secondary windings 18 and 20, respectively, suitably disposed on a magnetic core 22. The primary winding 18 of transformer 10 is connected through line conductors 24 and 26 to a source of alternating potential 12. The secondary winding 20 of transformer 10 is connected to the load 14 through line conductor 28 and 29. A reactor 16 having a core 30 and winding 32 is connected in a series circuit relationship with the secondary winding 20 of transformer 10 and the load 14. In this instance, the reactor 16 is connected between secondary winding 20 and the load 14 by line 28.

In the operation of the basic circuit shown in FIG. 1, an electric potential or voltage $V_p$ is impressed upon primary winding 18 by potential source 12. A voltage $V_s$ is developed across the secondary winding 20 of transformer 10, in accordance with the turn ratio of the transformer 10. The voltage across the load, $V_L$, is equal to the transformer secondary voltage $V_s$ less the voltage $V_R$ that is dropped across the reactor 16. Reactor 16 is constructed with a core 30 that changes its magnetic properties when a predetermined temperature is reached. Below the predetermined temperature, the core exhibits non-magnetic characteristics and the reactor is essentially an air-core reactor, presenting very little reactance to the flow of current to the load circuit, and hence the voltage applied to the load is substantially equal to the transformer secondary voltage $V_s$. When the core 30 of the reactor 16 reaches the predetermined temperature, the core 30 exhibits magnetic characteristics and the reactor 16 acts like an iron-core reactor, presenting a comparatively high reactance to the flow of current and thus reducing the amount of voltage $V_L$ available to the load 14.

By placing the reactor and core 16 in thermal communication with the transformer 10 and selecting the core material 30 to have a suitable transition temperature, it is possible to protect the transformer 10 during overloads by dropping a portion of the transformer secondary voltage $V_s$ across the reactor 16 when the temperature of the transformer reaches a dangerous magnitude. With less voltage $V_L$ available to the load 14, less current will be drawn from the transformer 10, reducing the load and consequent heating of said transformer. When the temperature of the transformer drops below the transition temperature of the core 30, the reactor returns to its air-core characteristics, allowing the voltage applied to the load 14 to return to its former magnitude.

Although FIG. 1 shows the reactor 16 connected in circuit relation with the secondary winding 20 of transformer 10, the invention is not to be so limited. It is equally suitable to place the reactor 16 in circuit relation with the primary winding 18 of transformer 10. In this instance, the reactor 16, which is again disposed in thermal communication with the transformer 10, reduces the voltage $V_p$ applied to primary winding 18 when the core 30 reaches a predetermined temperature, thus reducing the voltage $V_s$ developed across secondary winding 20 and hence the voltage $V_L$ applied to the load 14. Similar to when the reactor was located in the transformer secondary circuit, when the temperature of the core 30 falls below the transition temperature, the reactor again presents a low reactance to the flow of current in the circuit and the voltage across primary winding 18 is again very nearly equal to the voltage of potential source 12. This returns the transformer secondary voltage $V_s$ and the load voltage $V_L$ to their former magnitudes.

A core material which has been found to be suitable for use in the reactor hereinbefore described is chromium manganese antimonide. This intermetallic compound changes from a material exhibiting non-magnetic characteristics to one exhibiting magnetic characteristics at a predetermined temperature determined by its chemical composition. The transition temperature or the temperature at which the compound changes from a non-magnetic to a magnetic structure can be varied over a wide range by slight changes in the materials composition. The abrupt change in magnetic characteristics occurs because the distance between the compound atoms is varied. Thus, a temperature change, causing the chromium manganese antimonide to expand or contract, alters the distance between atoms and brings about magnetic change.

Figure 2:
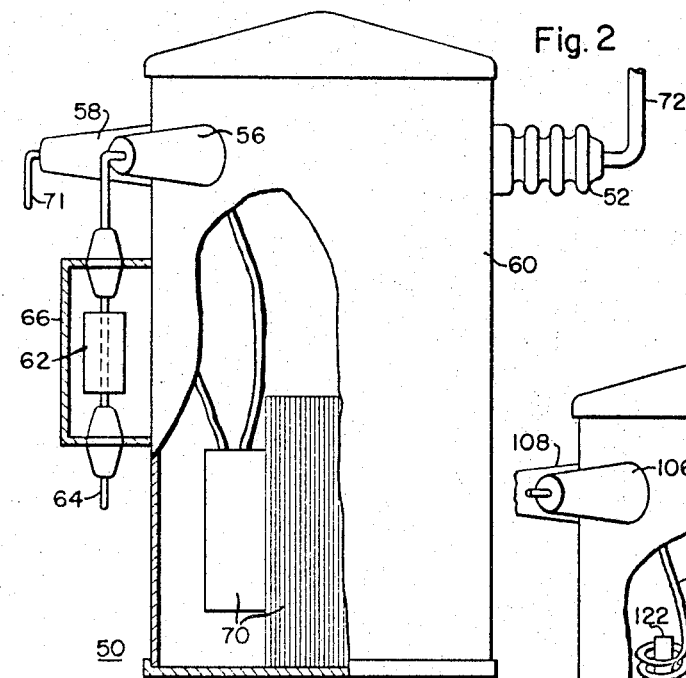
FIG. 2 shows a perspective view of a transformer, partially in section, illustrating one embodiment of the invention.
Figure 3:
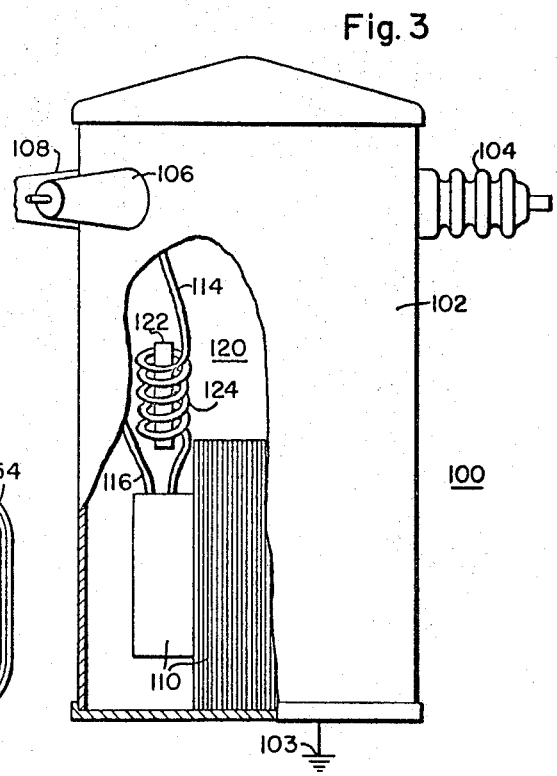
FIG. 3 shows a perspective view of a transformer, partially in section, illustrating still another embodiment of the invention.

FIGS. 2 and 3 show two of the many embodiments of the invention that may use the principles shown in FIG. 1. FIG. 2 shows a transformer 50 with an input terminal 52 and output terminals 56 and 58, all mounted on a partially cut away casing 60. The casing may be grounded as shown at 54, thus grounding one side of the high voltage winding, or transformers with two high voltage bushings may be used. In this instance, a core 62 comprising a ring or cylinder surrounds secondary conductor 64. A housing 66, shown in cross-section, encloses the core 62 and is mounted in thermal communication with the casing 60 of transformer 50, so that the core 62 will be responsive to the temperature of the transformer 50.

Instead of the core 62 taking the form shown in FIG. 2, a reactor having a suitable number of turns could be mounted within the housing 66 and the core 62 could take the form of a rod or bar and be mounted in inductive relationship or concentrically within said reactor. Further, instead of the core 62 encircling the conductor 64, which is connected to output terminal 56 and hence to the transformer core and coil structure 70, it could just as effectively encircle conductor 71 connected to output terminal 58, or conductor 72 connected to input terminal 52. However, as a practical matter, it is more suitable for the core to be disposed in inductive relationship with a low voltage conductor, such as conductors 64 or 71, since the core 62 must be located in close thermal communication with the transformer casing 50, and insulation problems are not as critical as they would be if the high voltage conductor 72 were to be placed in close proximity with the casing 60.

FIG. 3 shows still another embodiment of the invention, wherein the core is placed within the transformer enclosure itself. In FIG. 3, a transformer 100 is illustrated having a casing 102, shown partly in section, with input terminal 104 and output terminals 106 and 108 mounted on said casing. A core-coil structure 110 is shown mounted within the casing 102 and has a primary conductor (not shown) connected to input terminal 104 and secondary conductors 114 and 116 connected to output terminals 106 and 108, respectively. One side of the primary winding is connected to the transformer casing 102 and grounded at 103. The casing 102 may contain a liquid dielectric within which the core and coil structure 110 is immersed.

In this instance, a reactor 120 comprising a core 122 and coil 124 is shown connected between output terminal 106 and core-coil structure 110. The reactor 120 may be immersed in the liquid dielectric, or it may be mounted in the gas space above the liquid dielectric. In either position, it would be responsive to the temperature of the transformer 100. It will be appreciated that the reactor 120 could just as effectively be connected to conductor 116 from output terminal 108 to the core-coil structure 110, or in the conductor (not shown) from the input terminal 104 to the core-coil structure 110. In this instance, it would be just as practical to utilize the high voltage conductor as it would be the low voltage conductors 114 and 116, as the insulation problem inside the casing 102 is not as critical as it would be outside said casing, as in the embodiment shown in FIG. 2.

Also in FIG. 3, instead of using a reactor 120 having a coil 124 and core 122, it would be effective to use a core constructed in the form of a ring or cylinder and have the core surround conductors 114, 116 or the high voltage conductor, as in the embodiment of FIG. 2.

Although we have hereinbefore only mentioned placing the reactor or surrounding ring in circuit relation with one line or conductor, which would be the preferred embodiments, the invention should not be so limited as it would be equally effective to place reactors in circuit relation with two, three or all of the conductors.

Figure 4:
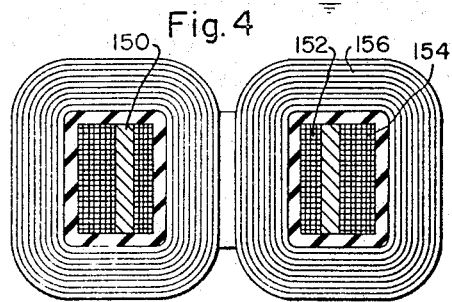
FIG. 4 shows a cross-section of a transformer core-coil assembly illustrating another embodiment of the invention.

Instead of placing a reactor containing the material having the temperature responsive magnetic characteristics in the conductors connecting the transformer windings with the load or source of potential as hereinbefore described, it would be very effective to design the use of the temperature responsive material into the transformer windings themselves. FIG. 4 shows a cross-section of a transformer core-coil assembly illustrating this embodiment whereby a temperature responsive material 150, such as chromium manganese antimonide, is disposed between the low voltage winding 152 and high voltage winding 154. More specifically, low voltage winding 152 and high voltage winding 154 are inductively disposed on a suitable magnetic core 156, with the temperature responsive material 150 disposed between the low voltage winding 152 and high voltage winding 154. This combination, instead of varying the reactance of a separate reactor in the transformer leads, varies the leakage reactance of the transformer itself. When the temperature responsive material is at a temperature below its magnetic change point, the material would be nonmagnetic and very little flux would flow through said material. When the material reaches the temperature of its magnetic change point, however, it would become magnetic, causing an increase in the amount of flux passing through the material, thus increasing the leakage reactance of the transformer and producing the desired voltage drop in the output voltage of the transformer. When the temperature of the temperature responsive material drops below its magnetic change point, the leakage reactance would be reduced to its previous value and the transformer output voltage would increase to its former magnitude.

The embodiment shown in FIG. 4 has the temperature responsive material disposed in thermal communication with the heat producing transformer windings, thus responding to any overload condition of the transformer without the thermal delay that would occur if the material were to be disposed in the cooling dielectric, next to the transformer casing, or some other position remote from the transformer windings.

The protective apparatus herein disclosed has many advantages. One of the most important is the fact that it allows a transformer to shed a portion of its load during peak or overload conditions, and therefore, allows a smaller rating transformer to be utilized than would be normally required. This is a very important consideration when thousands of transformers are involved, as in the distribution systems of electric power companies.

Another advantage lies in the fact that the protection is accomplished without any moving parts, assuring continuous protection for the transformer throughout its life.

Furthermore, because of the complete absence of moving parts, there is absolutely no maintenance required on the protective system.

It will, therefore, be apparent that there has been disclosed a protective device for electrical apparatus that will reduce the output voltage of said electrical apparatus and hence its load, when the temperature of the electrical apparatus reaches a predetermined temperature.

Since numerous changes may be made in the above-described apparatus and different embodiments of the invention may be made without departing from the spirit thereof, it is intended that all matter contained in the foregoing description or shown in the accompanying drawings shall be interpreted as illustrative, and not in a limiting sense.

We claim as our invention:

1. An electrical transformer comprising a magnetic core, first and second windings disposed in inductive relation with said magnetic core and in spaced concentric relation relative to one another, means having predetermined temperature responsive magnetic characteristics disposed between said spaced concentric first and second windings, said means being non-magnetic until a predetermined elevated temperature is reached, which causes the leakage reactance of said electrical inductive apparatus to increase when said predetermined temperature is reached.

2. An electrical transformer comprising primary and secondary windings, output conductors connected to said secondary winding, means including chromium manganese antimonide disposed between and in thermal communication with said primary and secondary windings, said means increasing the leakage reactance of said transformer when a predetermined temperature is reached, reducing the output voltage applied to said output conductors.

3. An electrical transformer comprising at least two windings adapted for connection to a source of potential and a load circuit, respectively, disposed in spaced concentric relation with one another, means disposed between and in thermal communication with said windings which has the characteristic of being non-magnetic below a predetermined temperature and magnetic above said predetermined temperature, said means increasing the leakage reactance of said inductive apparatus when said means is magnetic.

4. An electrical transformer for connection to a source of alternating potential and a load circuit which automatically reduces the potential applied to the load circuit when the transformer reaches a predetermined temperature, comprising at least two electrical windings disposed in spaced concentric relation with one another and adapted for connection to the source of alternating potential and the load circuit, respectively, means having temperature responsive magnetic characteristics disposed between and in thermal communication with said electrical windings, said means increasing the leakage reactance of the transformer when the transformer reaches the predetermined temperature, to reduce the potential applied to the load circuit, by changing from a non-magnetic to a magnetic condition at the predetermined temperature.

5. An electrical transformer comprising a magnetic core, first and second windings disposed in spaced concentric relation with one another and in inductive relation with said magnetic core, means disposed between said first and second windings and in thermal communication therewith, said means having temperature responsive magnetic characteristics, said means increasing the leakage reactance of the transformer by changing from a substantially non-magnetic state to a magnetic state when said windings reach a predetermined temperature, diverting flux from said magnetic core through said means.

References Cited

UNITED STATES PATENTS 3,239,783  3/1966  Yetter _____ 336—179

LEWIS H. MYERS, *Primary Examiner.*

T. J. KOZMA, *Assistant Examiner.*